United States Patent Office 3,408,803
Patented Nov. 5, 1968

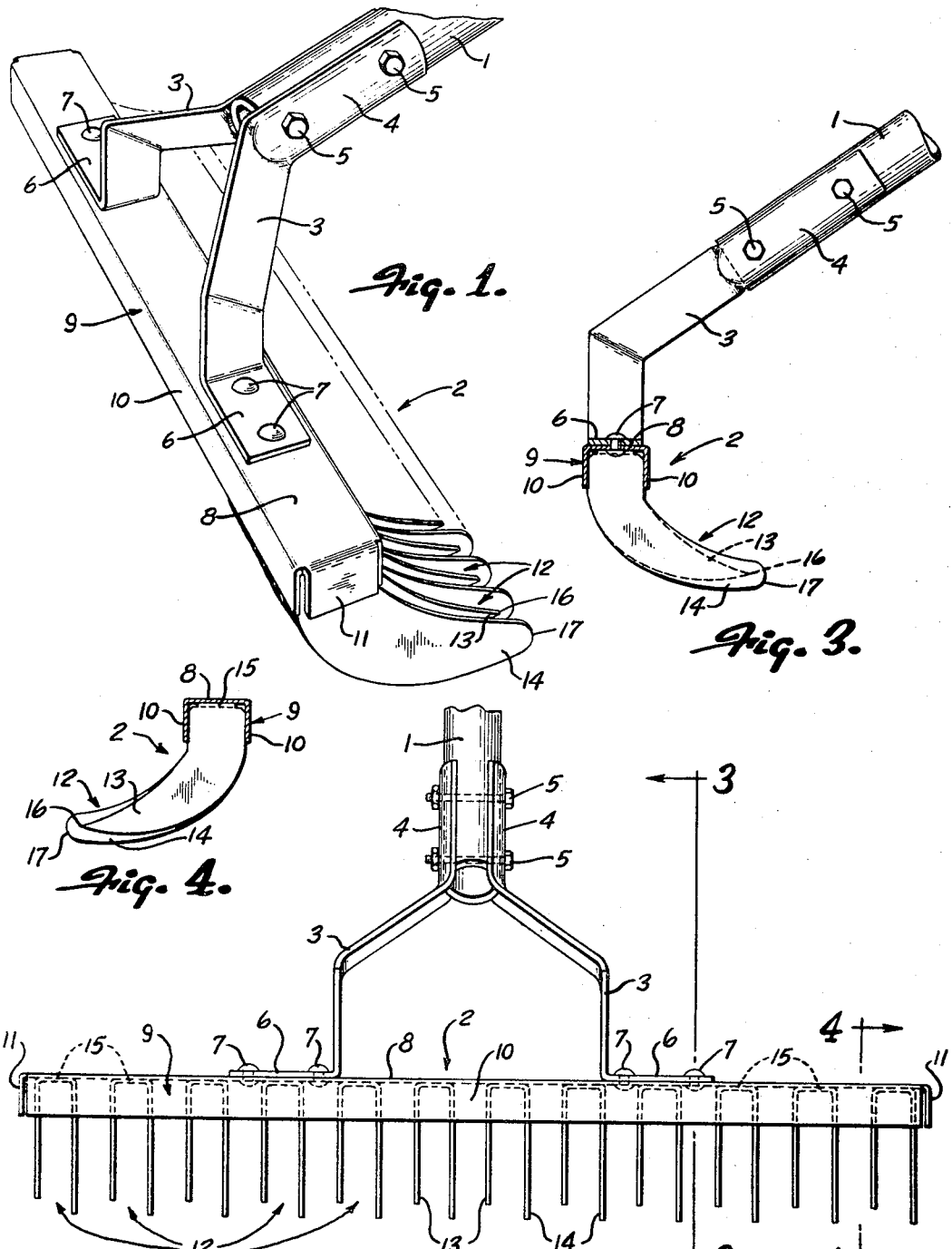

3,408,803
RAKE
Frederick B. Vanderveer, Grand Rapids, Mich., assignor to Bissell Inc., Grand Rapids, Mich., a corporation of Michigan
Filed Dec. 2, 1965, Ser. No. 511,171
5 Claims. (Cl. 56—400.01)

This invention relates to a rake and more particularly to a thatching rake for removing dead grass and other debris which has become matted onto the ground.

Previous manually operated thatching rakes have been subject to certain drawbacks. The most serious drawback has been that they were so constructed that the rake teeth would tend to dig deep into the ground unless the rake handle was held at a precise angle. In addition, such rakes were expensive to construct, due to the need for a strong tooth support.

The present invention overcomes these difficulties and provides a much improved rake as compared to prior rakes known to the inventor.

In accordance with the invention the rake is provided with a channeled tooth brace. The teeth alternate along the brace in such a manner to prevent a tendency for the rake to dig down deeply into the soil.

The accompanying drawing illustrates the best mode presently contemplated by the inventor for carrying out the invention.

In the drawing:

FIGURE 1 is a perspective view of a rake constructed in accordance with the invention, with the handle broken away;

FIG. 2 is an enlarged front end view of the rake with the handle broken away;

FIG. 3 is a view taken on line 3—3 of FIG. 2; and

FIG. 4 is a view taken on line 4—4 of FIG. 2.

As shown in the drawing, the rake of the invention generally comprises an elongated handle 1 of conventional type, and a rake head portion 2 secured to the lower end of handle 1. For this purpose, a pair of opposed brackets 3 are provided with curved upper ends 4 which are adapted to fit around the lower end of handle 1. Mounting means, such as bolts 5, extend through the bracket ends 4 and handle 1 to secure them together.

Brackets 3 spreadingly extend forwardly and downwardly and are provided with oppositely and outwardly extending lower flanges 6 which are secured as by studs 7, to the outer face of the web 8 of an elongated channel brace 9. Brace 9 also includes a pair of downwardly extending elongated flanges 10 joined by web 8. Web 8 extends beyond flanges 10 and is bent at both ends to form end members 11 which close the channel to form an elongated rectangular inverted box.

In accordance with the invention, the rake is constructed to prevent undesirable digging into the soil as the rake is pulled along the ground. For this purpose, a plurality of dual-tooth members 12 are arranged along the underside of brace 9. Each member 12 comprises a sharp pointed tooth 13 and a round or blunt end tooth 14 joined together at their upper ends as by a web 15. Webs 15 are secured to the lower surface of brace web 8. The upper root portions of teeth 13 and 14 are generally coextensive, and they both curve generally coextensively downwardly and rearwardly as the lower ends thereof are approached. However, tooth 13 is shorter than tooth 14 and tapers gradually to a sharp point 16 forwardly of the rounded end 17 of tooth 14. As shown, an axis running through the center of curvatures of all teeth 14 would be engaged by the points 16 of teeth 13.

Tooth members 12 are spaced approximately equally along brace 9, with the spacing between members 12 being approximately equal to the spacing of teeth 13 and 14 in any given member 12; thus forming a rake with approximately equally spaced teeth which alternate between short sharp ended and long blunt ended.

Brace 9 and tooth members 12 are preferably made from stamped sheet metal, with their various elements being flat. The cost of manufacture is therefor relatively low.

As the rake is pulled along the ground, the blunt ended teeth 14 tend to ride up on the ground, thus preventing sharp teeth 13 from digging deeply into the soil. This means to maintain teeth 13 at about the ground level provides that pressure contact is distributed evenly along the entire raking area.

Various modes of carrying out the invention are contemplated as being within the scope of the following claims particularly pointing out and distinctly claiming the subject matter which is regarded as the invention.

I claim:
1. In a rake:
   (a) a bracket for attachment to a handle,
   (b) a brace attached to said bracket,
   (c) a plurality of rearwardly facing sharp ended teeth attached to said brace,
   (d) and a plurality of rearwardly facing blunt ended teeth disposed between said sharp ended teeth,
   (e) said blunt ended teeth being generally coextensive with and longer than said sharp ended teeth.
2. The rake of claim 1 in which said sharp ended teeth alternate with said blunt ended teeth.
3. The rake of claim 2 in which adjacent sharp ended teeth and blunt ended teeth are spaced apart and joined together at their roots by a connecting web to form a dual tooth member.
4. The rake of claim 3 in which each said dual tooth member is spaced from the adjacent member by approximately the distance between teeth in each member.
5. The rake of claim 3 in which:
   (a) the said brace comprises:
      (1) a downwardly facing channel member having a pair of flanges joined by a web,
      (2) the ends of said web extending beyond said flanges and being bent downwardly to form an inverted box,
   (b) and the connecting web of said dual tooth member is secured to the lower face of the channel member web.

References Cited

UNITED STATES PATENTS

| | | | |
|---|---|---|---|
| 563,281 | 7/1896 | Kuehl | 56—400.04 |
| 784,724 | 3/1905 | Winfield | 56—400.01 |
| 1,352,386 | 9/1920 | Rundberg | 56—400.07 |
| 1,381,569 | 6/1921 | Linhoff | 56—400.07 |
| 1,537,005 | 5/1925 | Carson | 56—400.05 |
| 1,821,522 | 9/1931 | Machen | 56—400.01 |
| 1,894,306 | 1/1933 | Eifert | 56—400.16 |
| 2,495,947 | 1/1950 | Smith | 56—400.14 X |
| 2,790,297 | 4/1957 | Gardner | 56—400.14 |
| 3,193,999 | 7/1965 | Hester | 56—400.16 |
| 3,299,545 | 1/1967 | Husted | 56—400.06 |

FOREIGN PATENTS 26,975   6/1886   Canada.

ALDRICH F. MEDBERY, Primary Examiner.